Patented Apr. 21, 1942

2,280,756

UNITED STATES PATENT OFFICE 2,280,756

REGULATING THE GROWTH OF PLANTS

Albert J. Saukaitis, Wayne, Pa., assignor to American Chemical Paint Company, Ambler, Pa., a corporation of Delaware No Drawing. Application September 6, 1939, Serial No. 293,615

6 Claims. (Cl. 71—2)

The present invention relates to the art of regulating or controlling the growth of plants, and more particularly stated the invention concerns itself with compositions and methods for regulating or controlling the growth of higher plant life.

Prior to this invention, it was known that the growth of plants could be influenced, regulated or controlled by means of certain organic compounds, now variously referred to as "plant hormones," "growth promoters," "growth regulators," and "growth substances." As examples of such substances, which will hereinafter be referred to by the convenient term "plant hormones," may be mentioned phenyl, naphthyl, and indole acetic, propionic and butyric acids and certain of their derivatives such as the nitriles, lower alkyl esters and alkali metal and ammonium salts. The acids in the foregoing list will hereinafter be referred to as "the plant hormone acids."

The plant hormones may be used either to stimulate or to retard the growth of plants as may be desired by the plant breeder in a particular case. They may be used to speed up the germination of seeds and to stimulate the formation of roots, buds and flowers, as well as to cause stem elongation. They may also be used to inhibit or retard the formation of roots, buds and flowers and to inhibit or retard stem elongation. In addition, the plant hormones may be used to promote the healing of plant wounds and to produce seedless fruits without the use of pollen (parthenocarpy).

The present invention is based upon the discovery or observation that the thioamides of the plant hormone acids are particularly effective as plant growth substances and that they have certain advantages over previously used or suggested growth substances. For instance, alpha naphthylthioacetamide, which constitutes the preferred embodiment of the invention, is more active in producing artificial formation of fruits (parthenocarpy), in initiating rooting, and in inhibiting bud formation than most of the previously known growth substances. Furthermore, the thioamide has the great advantage over other growth substances in that it produces practically no epinasty (leaf curling).

In its very essence, the composition of the present invention consists of a mixture of a thioamide of a plant hormone acid, preferably alpha naphthylthioacetamide, and an inert diluent, vehicle or carrier. The inert diluent may be a solvent for the thioamide such as water, or it may be an oil or fat of either vegetable, animal or mineral origin such as olive oil, castor oil, lanolin or petroleum oil, etc., in which case the composition may be in the form of a suspension or emulsion. The diluent may also be a dry powdered filler such as talc, bentonite, clay, kaolin, charcoal, ground carbon or wood flour, in which latter case the composition will be in the form of a dry powder or dust.

The concentration of the essential ingredient (the thioamide) depends a great deal upon the nature of the diluent, carrier or vehicle, the particular species and form of plant to be treated, and the particular effect desired. In the case of the dry composition, the amount of thioamide may vary from 2 to 2000 parts per 100,000 parts of filler. In the case of a solution or emulsion, the thioamide may be present in from 1 to 200 parts per million of diluent. Part of the thioamide may be replaced by an equivalent amount of another growth substance.

Alpha naphthylthioacetamide, which constitutes the illustrative as well as the preferred embodiment of the invention, is a new chemical compound and is not mentioned in the literature. It may readily be prepared on either a laboratory or commercial scale in the following manner:

100 grams of alpha naphthylmethylcyanide or alpha naphthylacetonitrile, 500 milliliters of ethyl alcohol, 100 milliliters of water, 10 milliliters of concentrated aqueous ammonium hydroxide, 10 grams of potassium hydroxide, and a pinch of sulphur (less than one gram) are mixed together in a suitable form of reaction vessel and refluxed for approximately four hours while a continuous stream of hydrogen sulphide gas is passed through the mixture. The reaction mixture is then allowed to cool whereupon alpha naphthylthioacetamide crystallizes out. The crystals may then be filtered out, washed with a little alcohol, and finally recrystallized from hot water or a mixture of water and alcohol. The filtrate may be returned to the reaction vessel and further refluxed and saturated with hydrogen sulphide gas until nothing further crystallizes from the mixture when it is permitted to stand. The purified product has a melting point of 172° C.

The compositions of the invention may be applied to plants, slips, leaf cuttings, stem cuttings, scions, tubers, seeds, bulbs, seedlings, fruit or flowers in any of the various ways known to the art. For example, to induce better rootings of cuttings, the base of the cutting may be dipped into a composition in solution, emulsion or dust form. Seeds and bulbs may be treated by soaking them in a solution of the composition for about twenty-four hours, after which they may be dried sufficiently to permit them to be handled in sowing or planting. Seeds and bulbs may also be dusted with the composition in dry form, or coated with an emulsion of the composition. A convenient way of applying the composition to growing plants is by spraying. Other ways of applying the composition will readily suggest themselves to workers in the art, and for that reason need not be enumerated.

The use of the term "plants" in the appended claims is intended to include plants, slips, leaf cuttings, stem cuttings, scions, tubers, roots, seeds, bulbs, seedlings, fruit and flowers, wherever the context permits.

I claim:

1. A composition prepared for use for regulating the growth of plants, said composition containing as an essential ingredient alpha naphthylthioacetamide.

2. A composition prepared for use for regulating the growth of plants, said composition containing alpha naphthylthioacetamide dissolved in water.

3. A growth regulating composition for plants, said composition containing alpha naphthylthioacetamide dispersed in a substance selected from the group consisting of animal, mineral and vegetable fats and oils.

4. A method of treating plants, which consists in subjecting the plant to the action of alpha naphthylthioacetamide.

5. A method of treating seed before planting, which consists in treating the seed with a composition containing alpha naphthylthioacetamide.

6. As a composition of matter, alpha naphthylthioacetamide.

ALBERT J. SAUKAITIS.